United States Patent [19]

Mitsuno et al.

[11] Patent Number: 5,260,366
[45] Date of Patent: Nov. 9, 1993

[54] THERMOPLASTIC ELASTOMER COMPOSITION AND PROCESS FOR PRODUCING SAME

[75] Inventors: Tatsuyuki Mitsuno; Hideo Shinonaga; Masashi Yamamoto, all of Chiba, Japan

[73] Assignee: Sumitomo Chemical Company, Limited, Osaka, Japan

[21] Appl. No.: 742,499

[22] Filed: Aug. 5, 1991

Related U.S. Application Data

[63] Continuation of Ser. No. 492,323, Mar. 12, 1990, abandoned, which is a continuation of Ser. No. 283,918, Dec. 13, 1988, abandoned.

[30] Foreign Application Priority Data

Dec. 24, 1987 [JP] Japan ............... 62-328855

[51] Int. Cl.$^5$ ............... C08K 3/26
[52] U.S. Cl. ............... 524/426; 524/449; 524/451; 524/475; 524/505; 525/89; 525/280
[58] Field of Search ............... 524/475, 505; 525/89, 525/280

[56] References Cited

U.S. PATENT DOCUMENTS

| | | |
|---|---|---|
| 4,006,116 | 2/1977 | Dominquez. |
| 4,622,350 | 11/1986 | Icenogle et al. ............... 524/505 |
| 4,687,804 | 8/1987 | Shiraishi et al. ............... 524/505 |
| 4,707,514 | 11/1987 | Katsuki et al. ............... 525/280 |

FOREIGN PATENT DOCUMENTS 0168203 1/1986 European Pat. Off. ............... 525/89
0227139 7/1987 European Pat. Off..

Primary Examiner—Melvyn I. Marquis
Assistant Examiner—Mark Sweet
Attorney, Agent, or Firm—Cushman, Darby & Cushman

[57] ABSTRACT

A thermoplastic elastomer composition superior in moldability and appearance, little in anisotropy of mechanical properties, especially, tensile strength and retaining low temperature impact strength, is obtained by previously melt-kneading an intermediate composition comprising (a) 100 parts by weight of a selectively hydrogenated block copolymer which has at least two mono-alkenyl or mono-alkenylidene aromatic hydrocarbon polymer blocks A having a number-average molecular weight of 25,000-35,000 and at least one partially or completely hydrogenated aliphatic conjugated diene hydrocarbon polymer block B having a number-average molecular weight of 100,000-150,000, (b) 50-150 parts by weight of an extender oil and (c) 0-50 parts by weight of polypropylene I, then adding, to the kneaded intermediate composition, (d) polypropylene II containing at least 35% by weight of a propylene-ethylene block copolymer having a melt flow rate of 10-30 g/10 min. and an ethylene content of 3-15% by weight in such amount that total amount of polypropylene I plus polypropylene II is 200-400 parts by weight per 100 parts by weight of block copolymer (a) and then further melt kneading the mixture. Further addition of a filler to the composition can afford a thermoplastic elastomer composition of small linear expansion coefficient with retaining the above properties.

17 Claims, No Drawings

THERMOPLASTIC ELASTOMER COMPOSITION AND PROCESS FOR PRODUCING SAME

This is a continuation of application Ser. No. 07/492,323, filed on Mar. 12, 1990, now abandoned, which was a continuation of application Ser. No. 07/283,918, filed Dec. 13, 1988, now abandoned.

This invention relates to a thermoplastic elastomer composition having excellent appearance and a process for producing it.

Recently, thermoplastic elastomers have steadily expanded their applications including parts of automobiles, household appliances, etc. because of their low-hardness and flexibility as well as their moldability by conventional methods such as extrusion molding, injection molding, etc.

Especially, for the application to large functional parts of automobiles, e.g., automobile exterior trim parts such as bumpers, injection moldability, appearance of molded products, heat resistance, mechanical properties such as low-temperature impact resistance and paintability are required at a high level.

This invention relates to a thermoplastic elastomer composition which is excellent in injection moldability and capable of providing large molded products excellent in appearance, low in directional dependence of mechanical properties, especially tensile property, with keeping low-temperature impact resistance. It also relates to a process for producing the composition. This composition is especially intended to be used as automobile parts mentioned above.

Hitherto, a thermoplastic elastomer is known, which is mainly composed of polypropylene and a selectively hydrogenated block copolymer (referred to hereinafter as "block copolymer (A)") having at least two mono-alkenyl or mono-alkenylidene aromatic hydrocarbon polymer block A and at least one partially or completely hydrogenated aliphatic conjugated diene hydrocarbon polymer block B. This elastomer has been used for automobile parts, household appliances, wire coating and medical parts because of its excellent appearance, flexibility, rubber elasticity and moldability. When this is made into a large molded product such as a bumper, it exhibits a good appearance or gloss, however, it still suffers from inferior releasability from the mold after injection and from thickness dependence and anisotropy of mechanical properties, especially, tensile property which seem to be caused by orientation of block copolymer (A). The term "anisotropy" herein means a difference in properties depending upon a flow direction at molding (MD) or a direction (TD) transverse to the MD and can be expressed as a ratio MD/TD.

In order to solve the thickness dependence and anisotropy of mechanical properties, especially tensile property in large molded products of the thermoplastic elastomer mainly composed of block copolymer (A) and polypropylene, it can be considered to use block copolymer (A) of high molecular weight. However, such block copolymer (A) causes appearance of injection molded products to degrade, occurring flow mark or uneven gloss on their surface.

An object of this invention is to provide molded products of large size such as bumper parts for automobiles which have little thickness dependence and anisotropy in mechanical properties, especially tensile strength, and are good in moldability and superior in appearance with retaining low-temperature impact resistance.

Another object of this invention is to provide materials small in linear expansion coefficient with retaining the above mentioned characteristics for exterior trim parts of automobiles such as side protectors which require small dimensional changes in summer and winter.

As a result of the inventors' intensive study in an attempt to attain the above objects, this invention has been accomplished.

In accordance with the present invention, it has been found that a thermoplastic elastomer composition which is good in moldability, excellent in appearance and little in thickness dependence and anisotropy of mechanical properties, especially tensile strength, and retains low-temperature impact strength, can be obtained by (1) a process which comprises previously melt-kneading a specific block copolymer (A) together with an extender oil and a polypropylene, and then again melt-kneading them with addition of a specific polypropylene or (2) a process which comprises previously preparing a specific block copolymer (A) extended previously with an extender oil by melt-kneading, and then melt-kneading it with a specific polypropylene.

It has also been found that by further addition of a filler, a thermoplastic elastomer having the above properties and a small linear expansion coefficient can be obtained.

That is, this invention relates to a thermoplastic elastomer composition which comprises a previously melt-kneaded intermediate composition comprising (a) 100 parts by weight of a selectively hydrogenated block copolymer (block copolymer (A)) which has at least two mono-alkenyl or mono-alkenylidene aromatic hydrocarbon polymer blocks A having a number-average molecular weight of 25,000–35,000 and at least one partially or completely hydrogenated aliphatic conjugated diene hydrocarbon polymer block B having a number-average mulecular weight of 100,000–150,000, (b) 50–150 parts by weight of an extender oil and (c) 0–50 parts by weight of polypropylene I; and (d) polypropylene II which contains at least 35% by weight of a propylene-ethylene block copolymer having a melt flow rate of 10–30 g/10 min. and an ethylene content of 3–15% by weight, in such amount that total amount of polypropylene I plus polypropylene II is 200–400 parts by weight per 100 parts by weight of block copolymer (a).

This invention further relates to a process for producing a thermoplastic elastomer composition, which comprises previously melt-kneading an intermediate composition comprising (a) 100 parts by weight of the block copolymer (A), (b) 50–150 parts by weight of an extender oil and (c) 0–50 parts by weight of polypropylene I; then adding, to the kneaded intermediate composition, (d) polypropylene II containing at least 35% by weight of a propylene-ethylene block copolymer having a melt flow rate of 10–30 g/10 min. and an ethylene content of 3–15% by weight, in such amount that total amount of polypropylene I plus polypropylene II is 200–400 parts by weight per 100 parts by weight of block copolymer (a); and then further melt-kneading the mixture.

This invention further relates to the above mentioned thermoplastic elastomer composition which additionally contains (e) 50–150 parts by weight of a filler per 100 parts by weight of (a) block copolymer (A).

Furthermore, this invention relates to a process for producing a thermoplastic elastomer composition which further comprises adding to the thermoplastic elastomer composition, (e) 50–150 parts by weight of a filler per 100 parts by weight of (a) block copolymer (A). The filler may be added to either the intermediate composition or the final composition.

Hitherto, it has been known that a low molecular weight type of block copolymers having the same components as the block copolymer (A) improves polypropylene elastomers in terms of moldability, appearance and maintenance of low-temperature impact resistance, but degrades thickness dependence and anisotropy of mechanical properties, especially tensile strength. These problems are considered due to orientation of the block copolymer of low molecular weight type.

When a high molecular weight type of block copolymer (A) (the block copolymer (A) of this invention) is used in place of the low molecular weight type, low-temperature impact resistance is retained and the thickness dependence and anisotropy of mechanical properties, especially tensile strength are much reduced, but problems occur on moldability and appearance of molded products including flow mark and uneven gloss. These problems are assumed to be caused by inferior dispersion of the block copolymer (A).

In accordance with the present invention, it has been found that the above problems are solved by using a high molecular weight block copolymer (A) which is previously extended by an extender oil, in the form of an intermediate composition with polypropylene or an intermediate composition without polypropylene called an oil extended block copolymer. It has also been found that addition of a filler affords a thermoplastic elastomer composition which retains the above properties and also has small linear expansion coefficient.

Components of this invention are specifically explained below.

(a) Block Copolymer (A)

Block copolymer (A) is a selectively hydrogenated block copolymer which comprises at least two mono-alkenyl or mono-alkenylidene aromatic hydrocarbon polymer blocks A and at least one partially or completely hydrogenated aliphatic conjugated diene hydrocarbon polymer block B.

The mono-alkenyl or mono-alkenylidene aromatic hydrocarbon polymer block A is preferably constituted by monomers such as of styrene, α-methylstyrene or t-butylstyrene.

The aliphatic conjugated diene hydrocarbon polymer block B is preferably constituted by monomers such as of butadiene or isoprene.

In case butadiene is used as the conjugated diene monomer of the polymer block B, a butadiene copolymer of 1-4 structure and 1-2 structure is produced in the molecular chain of the polymer block B. When this block copolymer is hydrogenated, double bonds are saturated to give a structure comprising ethylene polymer portions produced from 1-4 structure and butylene polymer portions produced from 1-2 structure.

As a result, the block copolymer (A) has, for example, styrene-ethylene.butylene-styrene structure, which is called "SEBS".

As stated before, number-average molecular weight of mono-alkenyl or mono-alkenylidene aromatic hydrocarbon polymer block A in the block copolymer (A) is 25,000–35,000 and that of the polymer block B is 100,000–150,000.

If a block copolymer (A) in which number-average molecular weight of polymer block A is less than 25,000 or that of polymer block B is less than 100,000 is used to prepare a composition, high flowability and high gloss can be obtained, but thickness dependence and anisotropy of mechanical properties, especially tensile strength, become worse.

If a block copolymer in which number-average molecular weight of polymer block A is more than 35,000 or that of polymer block B is more than 150,000 is used, thickness dependence and anisotropy of mechanical properties, especially tensile strength, are satisfactory, but flowability is inferior and gloss and appearance of molded products are also inferior.

Many processes have been proposed for production of the block copolymer. According to the process disclosed in Japanese Patent Kokoku No. 40-23798 which is a representative one, block polymerization is effected in an inert solvent using lithium catalyst of Ziegler catalyst to obtain a block copolymer of a mono-alkenyl or mono-alkenylidene aromatic hydrocarbon and an aliphatic conjugated diene hydrocarbon.

Hydrogenation treatment of such a block copolymer is carried out in the presence of a hydrogenation catalyst in an inert solvent, for example, by the processes disclosed in Japanese Patent Kokoku Nos. 42-8704, 43-6636 and 46-20814. Hydrogenation rate is at least 50%, preferably 80% or more in polymer block B. Also, 25% or less of the aromatic unsaturated bonds in polymer block A are nuclear-hydrogenated.

Representative of such partially or completely hydrogenated block copolymers is one which is sold under the tradename of "KRATON ®-G" from Shell Chemical Co. in U.S.A.

(b) Extender Oil

The extender oil used in this invention as component (b) is a mineral oil called process oil or extender oil used for softening or extending rubbers or improving their processability, preferably paraffinic or naphthenic hydrocarbon oil containing 30% or less of aromatic hydrocarbon.

In general, these mineral type diluted oils are mixture of the three of aromatic ring, naphthenic ring and paraffinic chain hydrocarbons. Those which contain the paraffinic chain hydrocarbon in an amount of 50% or more of total hydrocarbons are called paraffinic hydrocarbon oils, those which contain the naphthenic ring hydrocarbon in an amount of 30–45% are called naphthenic hydrocarbon oils, and those which contain the aromatic hydrocarbon in an amount of 30% or more are called aromatic hydrocarbon oils. Paraffinic oils and naphthenic oils are superior to aromatic oils in dispersibility.

These extender oils have the following properties: a kinematic viscosity at 40° C. of 20–500 cst, a flow-point of $-10°--15°$ C. and a flash point of 170°-300° C.

Amount of the extender oil is 50–150 parts by weight per 100 parts by weight of block copolymer (A). If this is more than 150 parts by weight, thickness dependence and anisotropy of mechanical properties, especially tensile strength, appear and besides modulus of flexural rigidity and heat resistance decrease and viscousness with oil occurs to make the surface of molded product sticky. If less than 50 parts by weight, flowability is insufficient and uneven gloss and flow mark occur, resulting in inferior surface appearance of molded product.

(c) Polypropylene I

Polypropylene I used in this invention includes, for example, homopolypropylene, propylene-ethylene random copolymer, and propylene-ethylene block copolymer.

The homopolypropylene and the propylene-ethylene random copolymer preferably has a melt flow rate of 10–50 g/10 min. If melt flow rate is lower than 10 g/10 min., moldability of final composition and appearance of molded product are inferior. If the rate is higher than 50 g/10 min., properties of final composition, especially tensile strength and impact strength are deteriorated.

The propylene-ethylene random copolymer preferably has an ethylene content of 1–5% by weight. If ethylene content is more than 5% by weight, heat resistance of final composition is deteriorated.

The propylene-ethylene block copolymer preferably has an ethylene content of 3–15% by weight and a melt flow rate of 10–30 g/10 min. When melt flow rate is lower than 10 g/10 min., moldability of final composition and appearance of molded product are inferior. When the rate is higher than 30 g/10 min., properties of final composition, especially tensile strength and impact strength are reduced.

Amount of homopolypropylene, propylene-ethylene random copolymer or propylene-ethylene block copolymer in the intermediate composition is preferably 0–50 parts by weight per 100 parts by weight of block copolymer (A). When this is more than 50 parts by weight, appearance of molded product made from final composition is inferior. In addition, in case of homopolypropylene and propylene-ethylene random copolymer, if the amount exceeds 50 parts by weight, impact strength is also decreased.

(d) Polypropylene II

Polypropylene II used in this invention includes, for example, the above-mentioned homopolypropylene, propylene-ethylene random copolymer and propylene-ethylene block copolymer. However, it is necessary that the polypropylene II contains 35% by weight or more of a propylene-ethylene block copolymer having a melt flow rate of 10–30 g/10 min. and an ethylene content of 3–15% by weight. If content of the propylene-ethylene block copolymer is less than 35% by weight, impact strength of final composition is reduced.

Amount of the polypropylene components (polypropylenes I and II) in a final composition is preferably 200–400 parts by weight per 100 parts by weight of block copolymer (A). If this is less than 200 parts by weight, the composition is inferior in heat resistance and modulus of stiffness. If the amount is more than 400 parts by weight, modulus of flexural stiffness of final composition becomes too high, resulting in loss of flexibility and decrease in low-temperature impact strength.

(e) Filler

Inorganic fillers used as fillers in this invention are not critical, but are preferably calcium carbonate, talc, clay, silica, diatomaceous earth, alumina, zinc white, magnesium oxide, mica, calcium sulfite, calcium sulfate, calcium silicate, glass powder, glass fibers including those which are treated with silane, asbestos and gypsum fiber. Organic fillers are also not critical, but are preferably various wood flours, cellulose fibers, and melamine powders. These may be used alone or as a mixture thereof. Among those fillers, talc, calcium carbonate and mica are more preferred in view of a balance between impact resistance and heat resistance of a filler-containing polypropylene resin composition.

If fillers are subjected to surface treatment, a filler-containing polypropylene resin composition of higher quality in which the balance between stiffness and impact strength is improved, can be obtained. Surface treating agents include organic silane compounds such as vinyltriethoxy silane, vinyltris($\beta$-methoxyethoxy)silane, $\gamma$-aminopropyltrimethoxysilane, $\gamma$-aminopropyltriethoxysilane, $\gamma$-methacryloxypropyltrimethoxysilane, N-($\beta$-aminoethyl)-$\gamma$-aminopropyltrimethoxysilane and $\gamma$-glycidoxymethoxysilane.

In the present invention, amount of the filler is 50–150 parts by weight per 100 parts by weight of block copolymer (A) for both cases of using an intermediate composition and an oil-extended block copolymer (A). If the amount is more than 150 parts by weight, flowability is insufficient and uneven gloss and flow marks occur, resulting in poor appearance of molded product. If the amount is less than 50 parts by weight, linear expansion coeefficient is not sufficiently lowered.

Fillers may be added to either of an intermediate composition or a final composition.

(f) Methods of mixing and molding

In production of the thermoplastic elastomer composition of this invention, if necessary, various styrene elastomers such as styrene-butadiene random copolymer and styrene-butadiene block copolymer and various polyolefin elastomers such as non-crystalline ethylene-propylene copolymer and ethylene-propylene-unconjugated diene copolymer may be additionally incorporated in such range as substantially not damaging the various properties of the composition.

It is also possible to further add suitable amounts of various additives such as antioxidants, weathering agents, antistatic agents, foaming agents and colorants.

The composition of this invention can be obtained by uniformly mixing the above-mentioned components at a given mixing ratio. For the uniform mixing, there may be employed the method of mechanical melt kneading by an ordinary kneader for thermoplastic resins. The kneaders include, for example, single-screw extruder, twin-screw extruder, Banbury mixer, and twin roll. Mixing operation of the components may be carried out at once or divisionally.

(g) Properties and uses

The thermoplastic elastomer composition of this invention has mechanical strength, heat resistance, impact resistance, surface gloss, appearance and weathering resistance which are equal to or superior to those of olefinic thermoplastic elastomers.

Feature of this invention is that a thermoplastic elastomer composition can be obtained which is superior in moldability for large molded products and appearance of them, and very low in thickness dependence of mechanical properties, especially tensile strength,and anisotropy in the mechanical properties, with retaining low temperature impact strength.

It is also a feature of this invention that a thermoplactic elastomer which has a small linear expansion coefficient with retaining the above-mentioned properties can be obtained by adding fillers.

The composition of this invention can be molded and processed by molding machines normally used for thermoplastic resins and by methods such as injection molding, extrusion molding, blow molding and calendering.

Representative uses of the composition are as follows.

(1) Automobile exterior trim parts such as soft bumper, corner bumper, side shield, over rider, bumper mole and side mole.

(2) Automobile interior trim parts such as ceiling sheet, seat belt cover and interior mat.

(3) Various hose parts of household appliances such as washing machine and drier for bedclothes.

This invention will be explained in more detail by the following examples and comparative examples, but this invention should never be limited to them.

(1) Preparation of Intermediate Composition

A block copolymer (called "SEBS-1") having A-B-A structure comprising polystyrene block A having a number-average molecular weight of 29,000 and completely hydrogenated butadiene block B having a number-average molecular weight of 116,000 and a comparative block copolymer (called "SEBS-2") having A-B-A structure comprising polystyrene block A having a number-average molecular weight of 7,000 and completely hydrogenated butadiene block B having a number-average molecular weight of 35,000; a homopolypropylene (called "PP-1") having a melt flow rate of 20 g/10 min. as polypropylene I; Diana process oil PW-380, i.e., paraffinic oil having a kinematic viscosity at 40° C. of 381.6 cst and an average molecular weight of 746 manufactured by Idemitsu Kosan Co., Ltd. as an extender oil; and talc of JR-2 manufactured by Hayashi Kasei Co. as a filler, were mixed at ratios as shown in Table 1. To the mixture was further added 0.1 part by weight of "Irganox® 1010" by Ciba-Geigy Corp. as an antioxidant per 100 parts by weight of the above mixture. In case of intermediate compositions, MBR-1 to 3, 6 and 8 to 12, the resulting mixture was subjected to premixing for 5 minutes by a super mixer and then to melt kneading at 190° C. for 10 minutes by a Banbury mixer. In case of intermediate compositions, MBR-4, MBR-5 and MBR-7, the resulting mixture was subjected to mixing for 10 minutes by super mixer. The resulting kneaded product was pelletized by a single-screw extruder to obtain a respective intermediate composition shown in Table 1.

(2) Methods for Measurement of Properties

① Preparation of Test Specimen

An elastomer composition was molded into a flat sheet of 100 mm width, 400 mm length and 3 mm thickness by an injection molding machine, NEOMATT 515/150 manufactured by Sumitomo Heavy Industries Ltd. Then, the flat sheet was subjected to the following tests.

② Melt Flow Rate

This was measured according to JIS K7210 at 230° C. under a load of 2.16 kg.

③ Tensile Strength, Tensile Elongation

These were measured according to JIS K6301 at a pulling rate of 50 mm/min. on JIS No. 2 dumbbell specimens punched out of the flat sheet in its flow direction (MD) and transverse direction (TD).

④ Izod Impact Strength (Notched)

This was measured according to JIS K7110 at 23° C. and −30° C. on dumbbell specimens punched out of the flat sheet, having 12.7 mm width and 63.5 mm length with a V notch.

⑤ Flexural Modulus

This was measured according to JIS K7203 at a span of 50 mm and a bending rate of 10 mm/min.

⑥ Appearance

Flow mark, fish eye: The surface of the flat sheet of 100 mm × 400 mm × 3 mm thick was visually observed and graded by five point evaluation method as follows:

Inferior←1, 2, 3, 4, 5→superior

Stickiness: The surface of the flat sheet of 100 mm × 400 mm × 3 mm thick was touched by bare hand and stickiness was graded by feel at the touching by five point evaluation method as follows:

Inferior←1, 2, 3, 4, 5→superior

⑦ Linear Expansion Coefficient

This was measured in a temperature range of −30° C. to 80° C. by a thermomechanical analysis apparatus TMA-40 manufactured by Shimadzu Corp., on a test specimen of 12.7 mm × 12.7 mm square obtained from the flat sheet of 100 mm × 400 mm × 3 mm thick.

EXAMPLES 1-7 AND COMPARATIVE EXAMPLE 1-6

The previously prepared intermediate composition was mixed with homopolypropylene (PP-1) having a melt flow rate of 20 g/10 min. and a propylene-ethylene block copolymer (PP-2) having a melt flow rate of 20 g/10 min. and an ethylene content of 6% by weight with ethylene content of propylene and ethylene copolymerized portion being 38% by weight and an intrinsic viscosity of the copolymerized portion in tetralin solution at 135° C. being 4.8 dl/g as polypropylene II at a mixing ratio as shown in Table 2. To 100 parts by weight of this mixture was added 1.5 parts by weight of a black pigment master batch PEC865 manufactured by Sumika Color Co., followed by mixing for 2 minutes by a super mixer and then melt-kneading by a twin-screw extrusion kneader TEX-44 manufactured by Nihon Seikosho Co. set at 220° C. to obtain a sample of pelletized composition.

Test specimens of flat sheets were made from said sample by the above-mentioned method, and tensile strength, tensile elongation, Izod impact strength, flexural modulus, and linear expansion coefficient of the test specimen were measured and appearance thereof was also evaluated.

The results are shown in Tables 2 and 3. As is clear from Tables 2 and 3, the products obtained in Examples according to this invention were superior in appearance and balance of various properties to those obtained in Comparative Examples which lacked a constructive requirement of this invention.

As explained above, this invention provides a thermoplastic elastomer composition good in moldability, superior in appearance and little in anisotropy of mechanical properties, especially tensile strength, and retaining low temperature impact strength, and a process for producing the composition.

We claim:

TABLE 1

| | Unit | MBR-1 | MBR-2 | MBR-3 | MBR-4 | MBR-5 | MBR-6 | MBR-7 | MBR-8 | MBR-9 | MBR-10 | MBR-11 | MBR-12 |
|---|---|---|---|---|---|---|---|---|---|---|---|---|---|
| PP-1 | Part by weight | 16 | 20 | 27 | — | — | 27 | — | 20 | 10 | 27 | 27 | 27 |
| PW380 | | 80 | 100 | 120 | 100 | 80 | 120 | 120 | 100 | 30 | 200 | 120 | 120 |
| SEBS-1 | | 100 | 100 | 100 | 100 | 100 | 100 | 100 | — | 100 | 100 | 100 | — |
| SEBS-2 | | — | — | — | — | — | — | — | 100 | — | — | 100 | — |
| Talc | | — | — | — | — | — | 79 | — | — | — | — | 226 | 79 |
| Total | Part by weight | 196 | 220 | 247 | 200 | 280 | 326 | 220 | 220 | 140 | 327 | 473 | 326 |

TABLE 2

| | | Unit | Example 1 | 2 | 3 | 4 | 5 | 6 | 7 |
|---|---|---|---|---|---|---|---|---|---|
| mixing ratio | | | | | | | | | |
| PP-1 | | Part by weight | — | — | 1' | 20 | 16 | — | 27 |
| PP-2 | | Part by weight | 240 | 270 | 300 | 270 | 240 | 200 | 200 |
| Intermediate composition | | Part by weight | MBR-1 196 | MBR-2 220 | MBR-3 247 | MBR-4 200 | MBR-5 180 | MBR-6 326 | MBR-7 220 |
| Properties | | | | | | | | | |
| Melt flow rate | | g/10 min. | 10.4 | 14.1 | 19.7 | 13.7 | 10.5 | 16.2 | 20.1 |
| Tensile properties | Strength[1] MD | kg/cm² | 243(1.06) | 232(1.07) | 205(1.08) | 230(1.06) | 240(1.04) | 177(1.08) | 208(1.09) |
| | TD | | 229 | 216 | 189 | 218 | 230 | 164 | 190 |
| | Elongation MD | % | 660 | 700 | 630 | 710 | 670 | 660 | 640 |
| | TD | | 680 | 660 | 650 | 670 | 680 | 630 | 670 |
| Izod impact strength (notched) | 23 °C. | kg·cm/cm | NB | NB | NB | NB | NB | NB | NB |
| | −30 °C. | | NB | NB | NB | NB | NB | NB | NB |
| Flexural modulus | | kg/cm² | 4600 | 4500 | 4450 | 4400 | 4580 | 4650 | 4600 |
| Appearance | Flow mark | — | 3 | 5 | 5 | 5 | 3 | 4 | 5 |
| | Fish eye | — | 5 | 5 | 5 | 5 | 5 | 5 | 5 |
| | stickiness | — | 5 | 5 | 5 | 5 | 5 | 5 | 5 |
| Linear expansion coefficient | | ×10⁻⁵ cm/cm·°C. | 13.0 | 12.8 | 12.6 | 12.7 | 13.1 | 8.2 | 12.5 |

[1]: Value in ( ) is MD/TD ratio of tensile strength.

TABLE 3

| | | Unit | Comparative Example 1 | 2 | 3 | 4 | 5 | 6 | 7 |
|---|---|---|---|---|---|---|---|---|---|
| Mixing ratio | | | | | | | | | |
| PP-1 | | Part by weight | 20 | — | — | — | — | — | 140 |
| PP-2 | | Part by weight | 270 | 270 | 171 | 398 | 175 | 200 | 60 |
| PW380 | | Part by weight | 100 | — | — | — | — | — | — |
| SEBS-1 | | Part by weight | 100 | — | — | — | — | — | — |
| Intermediate composition | | Part by weight | — | MBR-8 220 | MBR-9 140 | MBR-10 327 | MBR-11 473 | MBR-12 326 | MBR-13 247 |
| Properties | | | | | | | | | |
| Melt flow rate | | g/10 min. | 15.1 | 20.1 | 6.5 | 28 | 7.1 | 16.2 | 22.0 |
| Tensile properties | Strength[1] MD | kg/cm² | 228(1.18) | 180(1.28) | 245(1.06) | 192(1.18) | 151(1.19) | 172(1.32) | 208(1.15) |
| | TD | | 194 | 140 | 230 | 163 | 127 | 130 | 180 |
| | Elongation MD | % | 650 | 620 | 670 | 620 | 470 | 550 | 620 |
| | TD | | 600 | 540 | 700 | 540 | 410 | 470 | 590 |
| Izod impact strength (notched) | 23 °C. | kg·cm/cm | NB | NB | NB | NB | NB | NB | NB |
| | −30 °C. | | NB | NB | NB | 20 | 8 | NB | 7 |
| Flexural modulus | | kg/cm² | 4610 | 4500 | 4700 | 4000 | 5100 | 4500 | 4150 |
| Appearance | Flow mark | — | 3 | 5 | 1 | 5 | 1 | 5 | 5 |
| | Fish eye | — | 1 | 5 | 5 | 5 | 5 | 5 | 5 |
| | Stickiness | — | 5 | 5 | 5 | 2 | 5 | 5 | 5 |
| Linear expansion coefficient | | ×10⁻⁵ cm/cm·°C. | 12.7 | 12.6 | 12.8 | 12.4 | 4.0 | 8.1 | 12.8 |

[1]: Value in ( ) is MD/TD ratio of tensile strength.

1. A thermoplastic elastomer composition which consists essentially of:
   a previously melt-kneaded intermediate composition consisting essentially of (a) 100 parts by weight of a selectively hydrogenated block copolymer which has at least two mono-alkenyl or mono-alkenylidene aromatic hydrocarbon polymer blocks A having a number-average molecular weight of 25,000–35,000 and at least one partially or completely hydrogenated aliphatic conjugated diene hydrocarbon polymer block B having a number-average molcular weight of 100,000–150,000, (b) 50–150 parts by weight of an extender oil and (c) polypropylene I; and
   (d) polypropylene II which contains at least 35% by weight of a propylene-ethylene block copolymer having a melt flow rate of 10–30 g/10 min. and an ethylene content of 3–15% by weight in such amount that total amount of polypropylene I plus polypropylene II is 200–400 parts by weight per 100 parts by weight of block copolymer (a);
   whereby the hydrogenated block copolymer (a) is mixed with the extender oil (b) and the polypropylene I (c) to form the melt-kneaded intermediate composition, before the melt-kneaded intermediate composition is mixed with the polypropylene II (d).

2. A thermoplastic elastomer composition according to claim 1 which additionally contains (e) 50–150 parts by weight of a filler per 100 parts by weight of block copolymer (a).

3. A thermoplastic elastomer composition according to claim 1 wherein the mono-alkenyl aromatic hydrocarbon polymer block A is polystyrene.

4. A thermoplastic elastomer composition according to claim 1 wherein the mono-alkenylidene aromatic hydrocarbon polymer block A is poly-α-methylstyrene or poly-t-butylstyrene.

5. A thermoplastic elastomer composition according to claim 1 wherein the block copolymer (a) is a selectively hydrogenated block copolymer having two polystyrene blocks as block A and having one partially or completely hydrogenated polybutadiene block as block B.

6. A thermoplastic elastomer composition according to claim 1 wherein the extender oil (b) is a hydrocarbon oil.

7. A thermoplastic elastomer composition according to claim 2 wherein the filler (e) is at least one member selected from the group consisting of talc, calcium carbonate and mica.

8. A thermoplastic elastomer composition according to claim 1, wherein the polypropylene (I) is at least one selected from a homopolypropylene, a propylene-ethylene random copolymer and a propylene-ethylene block copolymer.

9. A thermoplastic elastomer composition according to claim 8, wherein the propylene-ethylene random copolymer has an ethylene content of 1–5% by weight.

10. The thermoplastic elastomer composition according to claim 8, wherein the propylene-ethylene block copolymer has an ethylene content of 3–15% by weight.

11. A thermoplastic elastomer composition according to claim 1, wherein the polypropylene (II) contains at least one selected from a homopolypropylene, a propylene-ethylene random copolymer and a propylene-ethylene block copolymer.

12. A thermoplastic elastomer composition according to claim 11, wherein the propylene-ethylene random copolymer has an ethylene content of 1–5% by weight.

13. A thermoplastic elastomer composition which consists essentially of:
   a previously melt-kneaded intermediate composition consisting essentially of (a) 100 parts by weight of a selectively hydrogenated block copolymer which has at least two mono-alkenyl or mono-alkenylidene aromatic hydrocarbon polymer blocks A having a number-average molecular weight of 25,000–35,000 and at least one partially or completely hydrogenated aliphatic conjugated diene hydrocarbon polymer block B having a number-average molecular weight of 100,000–150,000, (b) 50–150 parts by weight of an extender oil, and (c) 0–50 parts by weight of a polypropylene I, selected from the group consisting of a homopolypropylene, a propylene-ethylene random copolymer and a propylene-ethylene block copolmyer; and
   (d) a polypropylene II which contains at least 35% by weight of a propylene-ethylene block copolymer having a melt flow rate of 10–30 g/10 min. and an ethylene content of 3–15% by weight in such amount that total amount of polypropylene I plus polypropylene II is 200–400 parts by weight per 100 parts by weight of block copolymer (a), wherein the hydrogenated block copolymer (a) is mixed with the extender oil (b) and the polypropylene I (c) to form the melt-kneaded intermediate composition, where after said melt-kneaded intermediate composition is mixed with the polypropylene II (d).

14. A thermoplastic elastomer composition according to claim 13, wherein the polypropylene I is a propylene-ethylene random copolymer having an ethylene content of 1–5% by weight.

15. A thermoplastic elastomer composition according to claim 13, wherein the polypropylene I is a propylene-ethylene block copolymer having an ethylene content of 3–15% by weight.

16. A thermoplastic elastomer composition according to claim 13, wherein the polypropylene (II) contains at least one selected from a homopolypropylene, a propylene-ethylene random copolymer and a propylene-ethylene block copolymer.

17. A thermoplastic elastomer composition according to claim 16, wherein the propylene-ethylene random copolymer has an ethylene content of 1–5% by weight.

* * * * *